(12) United States Patent
Wallace

(10) Patent No.: US 9,028,898 B2
(45) Date of Patent: May 12, 2015

(54) UNIVERSAL AND RESTRICTIVE ENCLOSURES FOR SAFELY REPRESSURIZING SPARKLING WINES AND OTHER CARBONATED BEVERAGE

(76) Inventor: R. Evan Wallace, Seattle, WA (US)

( * ) Notice: Subject to any disclaimer, the term of this patent is extended or adjusted under 35 U.S.C. 154(b) by 904 days.

(21) Appl. No.: 12/674,548

(22) PCT Filed: Aug. 22, 2008

(86) PCT No.: PCT/US2008/074067
§ 371 (c)(1),
(2), (4) Date: Feb. 3, 2011

(87) PCT Pub. No.: WO2009/026541
PCT Pub. Date: Feb. 26, 2009

(65) Prior Publication Data
US 2011/0151085 A1   Jun. 23, 2011

Related U.S. Application Data

(60) Provisional application No. 60/957,301, filed on Aug. 22, 2007.

(51) Int. Cl.
| | | |
|---|---|---|
| *B65B 25/06* | (2006.01) | |
| *C10J 1/00* | (2006.01) | |
| *B01F 3/04* | (2006.01) | |
| *C12H 1/14* | (2006.01) | |

(52) U.S. Cl.
CPC .............. *B01F 3/04794* (2013.01); *C12H 1/14* (2013.01)

(58) Field of Classification Search
CPC .......................................... B01F 3/04
USPC .................. 426/477, 397, 398, 394; 422/129; 261/76, DIG. 75; 210/220; 61/75
See application file for complete search history.

(56) References Cited

U.S. PATENT DOCUMENTS

| | | |
|---|---|---|
| 4,825,665 A | 5/1989 | Micallef |
| 5,635,232 A | 6/1997 | Wallace |
| 5,725,896 A | 3/1998 | Banks |
| 5,780,083 A * | 7/1998 | Wright et al. .................. 426/112 |
| 2005/0017134 A1* | 1/2005 | Hooper .......................... 248/103 |

* cited by examiner

*Primary Examiner* — Rena L Dye
*Assistant Examiner* — Lela S Williams

(57) ABSTRACT

The present disclosure is related to illustrative embodiments of an apparatus and method for maintaining carbonation of sparkling beverages, such as sparkling wines, cocktails, and non-alcoholic beverages such as sodas and coffee. A transparent, shatter-resistant, height-adjustable carbonation enclosure is used to contain an opened bottle of a sparkling beverage. An air-tight carbonation cap with a built-in one-way valve is used to re-carbonate the beverage inside the bottle using a pressurized gas source. The base of the carbonation enclosure includes a platform that may be used to adjust the effective height of the enclosure to fit the height of the bottle and provide an air-tight interface between an opening of the bottle and the carbonation cap. The carbonation enclosure further includes a number of openings to open air to prevent pressurization of the carbonation enclosure. Another illustrative embodiment includes a safety enclosure for multiple bottles pressurized directly by conical nozzles.

2 Claims, 8 Drawing Sheets

UNIVERSAL AND RESTRICTIVE ENCLOSURES FOR SAFELY REPRESSURIZING SPARKLING WINES AND OTHER CARBONATED BEVERAGE

CROSS-REFERENCE TO RELATED APPLICATIONS

This patent application is the U.S. National Phase of International Patent Application No. PCT/US08/74067, filed on Aug. 22, 2008, which claims priority to U.S. Provisional Patent Application No. 60/957,301, filed on Aug. 22, 2007, both of which are incorporated herein by reference in their entireties.

TECHNICAL FIELD

The present invention relates to the method and apparatus for preserving opened bottles of sparkling wines and other carbonated beverages. In particular, two types of illustrative embodiments of rigid safety enclosures are described; one that is universal and fits most bottles on the market, and a category of enclosures that are very restrictive and can be made to exclude all but a single specific target bottle.

BACKGROUND

Carbonated beverages, such as sparkling wines like Champagne, rapidly loose their carbonation and undergo other flavor changes after opening the sealed cap of the bottle containing such beverages. The value and consumption of carbonated beverages, especially expensive varieties of sparkling wines, decline as the carbonation is lost within a few hours. Often, the entire contents of a bottle are not consumed at once. As such, the value and use of the beverage remaining in the bottle is severely curtailed. The loss of part of the contents of an expensive bottle of sparkling wine may be significant, especially for commercial establishments such as bars and restaurants. The ability to maintain carbonation of or add carbonation to sparkling beverages can be a valuable source of savings to both individuals and commercial establishments.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present disclosure, the following Detailed Description is intended to be read in association with the accompanying drawings, wherein.

DETAILED DESCRIPTION

Figure 1:
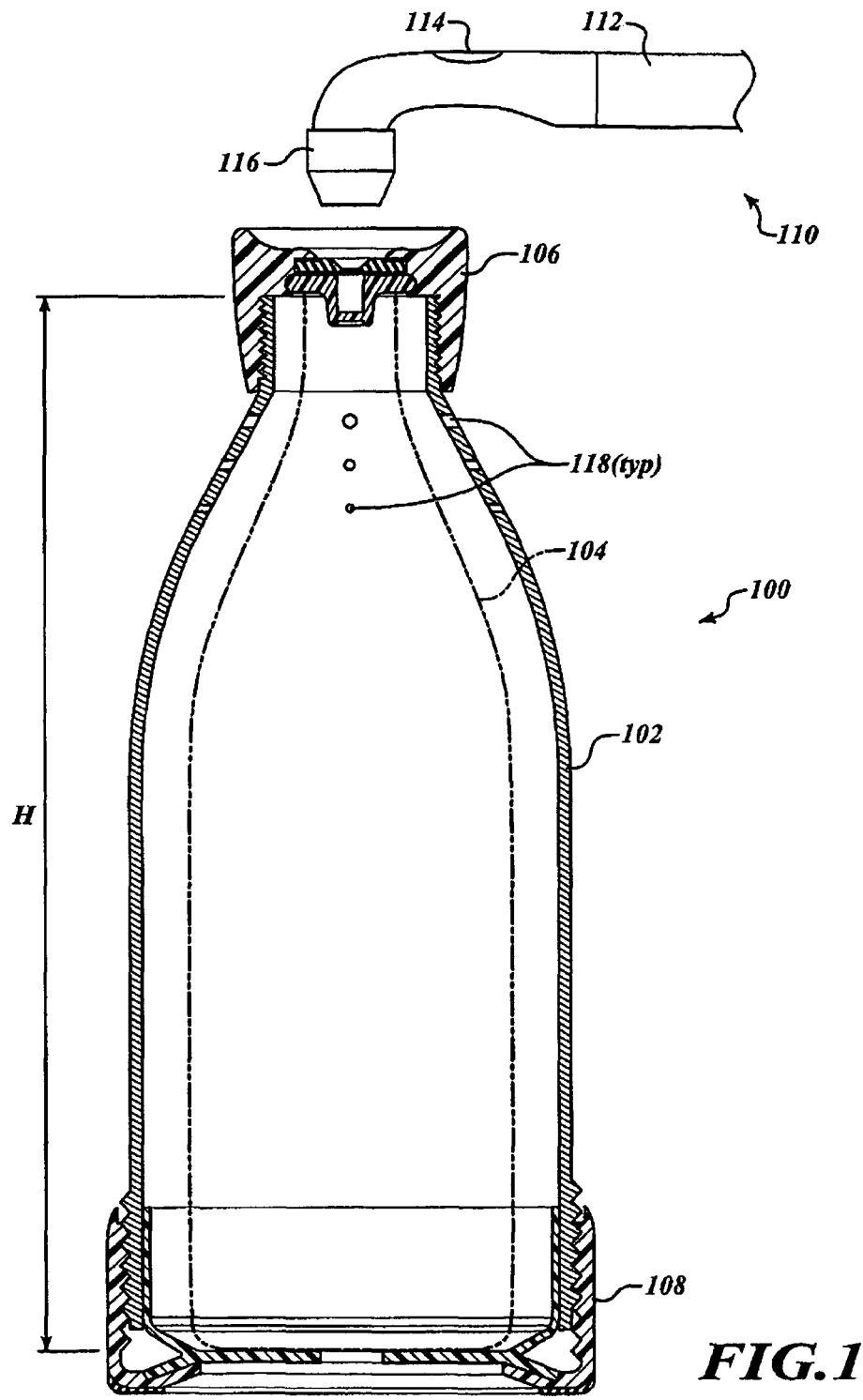
FIG. 1 is a pictorial diagram showing an illustrative embodiment of a carbonation maintenance system.

The following description is presented to enable a person skilled in the art to make and use the disclosure, and is provided in the context of particular applications of the disclosure and their requirements. Various modifications to the disclosed embodiments will be readily apparent to those skilled in the art and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Throughout the specification, and in the claims, the term "connected" means a direct physical connection between the components that are connected, without any intermediate components. The term "coupled" means either a direct physical connection between the components that are connected, or an indirect connection through one or more intermediary components.

Briefly described, the present disclosure is related to illustrative embodiments of an apparatus and method for maintaining carbonation of sparkling beverages, such as sparkling wines, carbonated liquors such as carbonated vodkas, sparkling cocktails, and non-alcoholic beverages such as sodas, coffee, and coffee drinks. In one illustrative embodiment, a transparent, shatter-resistant, height-adjustable carbonation enclosure is used to contain an opened bottle of a sparkling beverage. An air-tight carbonation cap is used to isolate the internal space of the bottle from outside. A one-way valve built into the carbonation cap may be used to re-pressurize the beverage inside the bottle using a pressurized gas source. The base of the carbonation enclosure includes a platform that may be used to adjust the effective height of the enclosure to fit the height of the bottle and provide an air-tight interface between an opening of the bottle and the carbonation cap. The effective height of the carbonation enclosure is that portion of the length of the carbonation enclosure that tightly encloses the length of the bottle held inside the carbonation enclosure. The carbonation enclosure further includes a number of openings to open air to prevent pressurization of the carbonation enclosure during the carbonation of the beverage or during removal of the carbonation cap, among other reasons discussed below. The injection of carbon dioxide gas ($CO_2$) through the carbonation cap into the headspace of the bottle, pressurizes the bottle back to its original pressure and composition of gases, greatly extending the shelf life of the opened bottle.

Although throughout this specification, the descriptions and drawings are directed to a manual carbonation enclosure, but the disclosure is not so limited. The same basic system configuration and methods may be used at larger scales, such as a drum container, in which carbonated cocktails or sparkling wine may be preserved or produced in bulk in a stationary apparatus without departing from the spirit of the disclosure. For example, in one illustrative embodiment, a Champagne "keg", in which large quantities of sparkling wine or other carbonated beverages are kept under high pressure (60-90 psi), and dispensed under counter-pressure filling into an intermediate serving container, which is then detached and used to dispense the beverage into a glass. Generally, the high pressures typical in a sparkling wine make it very difficult or impossible to dispense the liquid directly via a tap, as with beer, because the fluid delivery velocity is so great that the subsequent agitation would completely flatten the beverage. Additionally, the same basic apparatus and method may also be used in automated or machine-operated carbonation enclosures. And although the descriptions are presented with respect to the maintenance of wine or cocktail beverage using $CO_2$ gas, the same apparatus and process may be used to dissolve other types of gas in other non-beverage liquids for other purposes.

The overall carbonation system 100, as depicted in FIG. 1, is an illustrative embodiment of a wine bottle carbonation enclosure and a carbonation device. The system includes a carbonation enclosure 102 for containing a wine bottle 104. In one illustrative embodiment, the carbonation enclosure 102 is constructed from a transparent material, such as polycarbonateor other shatter-resistant, clear plastic with a few air-vent openings 118 to prevent the pressurization of the carbonation enclosure 102. The air-vent openings 118 also help prevent condensation, and allow any accumulated condensation and/or trapped wine to drain from the carbonation enclosure 102 during pouring. The air-vent openings 118 also allow pressure to escape when opening the carbonation cap 106. Typically, some of the gas from the bottle 104 gets shunted into the carbonation enclosure 102 when the carbonation cap 106 is unscrewed, and the air-vent openings 118 help vent this gas quickly to prevent bursting the carbonation enclosure 102.

The carbonation enclosure 102 further includes an air-tight carbonation cap 106 for sealing the bottle 104. A removable base cap 108 is used to close an opening at the bottom of the carbonation enclosure 102 after placing the bottle 104 inside. The base cap 108 is typically threaded to keep the bottle 104 securely inside the carbonation enclosure 102 as well as to adjust the height H of the carbonation enclosure 102 to fit the height of the bottle 104. In one illustrative embodiment, the base cap 108 encloses a body 214, discussed below with respect to FIG. 2A, while in another illustrative embodiment, the base cap 108 is enclosed by the body 214.

The gas delivery device 110 typically includes or is coupled to a source of gas, such as a pressurized gas tank. In one illustrative embodiment, an actuation button or handle 114 is used to start and stop the flow of gas through a conical nozzle 116. In another illustrative embodiment, the flow of gas may be initiated by simply pressing the conical nozzle 116 against a gas port 202 built into the carbonation cap 106, described in greater detail with respect to FIGS. 4A and 4B. In this embodiment, the nozzle 116 is spring-loaded such that when pressed opens a passage for flow of the gas through the nozzle 116. In one illustrative embodiment, the gas delivery device 104 is a self-contained device including a pressurized gas cartridge and pressure regulator in the body 112. Generally, the nozzle 116 has a conical shape for easy, quick, and secure coupling with the gas port of the carbonation cap 106. In another illustrative embodiment, the gas delivery device 110 may be connected, via a flexible hose or other similar gas delivery means, to a pressure regulator coupled to a bulk pressurized gas tank (not shown in the figure.) In this embodiment, the gas delivery device 110 includes a handle section, coupled to the flexible hose, having an actuation mechanism, such as a button 114, and a nozzle 116. In one illustrative embodiment, the gas delivery device 110 consists of a disposable $CO_2$ cartridge housed within the body 112, a preset adjustable regulator (not shown), a thumb-actuated valve (not shown) that starts and stops gas flow, and a conical rubber nozzle 116 through which gas flows. In this embodiment, it is important that the axis of the conical rubber nozzle 116 be at an angle with respect to the axis of the body 112 containing the $CO_2$ cartridge. This is so that the gas delivery device 110 can easily be held in such an orientation while injecting gas that the $CO_2$ cartridge is not inverted. If the $CO_2$ cartridge were inverted while filling, it could allow liquid $CO_2$ to flow through the regulator and other gas pathways, possibly freezing them up with dry ice and blocking gas flow.

One of the functions of the carbonation enclosure 102 is safety. A pressurized glass container, such as a bottle of sparkling wine, is inherently hazardous, as there is a potential of rupture of the container, due to, for example, an impact or a flaw in the glass container, such as a bubble or a crack. Such rupture of the glass container under pressure can project shards of broken glass. Accordingly, a system for sparkling wine preservation, to be commercially viable, must feature a safety enclosure capable of both preventing breakage of the bottle in typical usage situations, and containing any glass fragments resulting from breakage in the event of a spontaneous rupture of the bottle.

The carbonation enclosure 102 may also be used to cool the sparkling beverage. A pressure-regulated $CO_2$ source typically delivers $CO_2$ to the headspace of the bottle 104 at about 60-65 psi (pounds per square inch). This pressure is important, as it is the pressure in the headspace of the bottle 104 at typical serving temperatures of 36-40 F. It is well-known in the art that the partial pressure of $CO_2$ at cellar temperatures in a sparkling wine made by the traditional method (secondary fermentation in the bottle) is around 90 psi. However, $CO_2$ solubility increases strongly with decreasing temperatures. At serving temperatures, some of the $CO_2$ in the headspace dissolves into solution, lowering the headspace pressure to about 60-65 psi in most sparkling wines. This is the pressure that the re-pressurized bottle 104 should be returned to, to avoid changing the equilibrium level of dissolved carbon dioxide. Therefore, it is desirable to carbonate the beverage to about 60-65 psi when cold. In one illustrative embodiment, the carbonation enclosure 102 may be filled with ice around the bottle 104 for cooling. In another illustrative embodiment, a cooling gas may be circulated around the bottle 104 in the carbonation enclosure 102, for example, using a tubing configuration for transporting the cooling gas into and out of the carbonation enclosure 102 in the space surrounding the bottle 104 inside the carbonation enclosure 102. In another illustrative embodiment, electronic cooling elements may be incorporated in the carbonation enclosure 102 to cool the sparkling beverage before carbonation or serving.

In one illustrative embodiment, the carbonation enclosure 102 is a rigid universal enclosure and can be adjusted to accommodate a wide range of wine bottle sizes and shapes, varying by several inches in height and an inch or more in width. This embodiment of the carbonation enclosure 102 is a single enclosure that fits the known range of bottle sizes and shapes, is simple and quick to use, is compact, and is inherently safe.

In another illustrative embodiment, the carbonation enclosure 102 is a restrictive embodiment in that it fits only one or a few of bottles on the market to provide exclusivity and distinctiveness for a particular user and/or manufacturer of wines. Such a restrictive embodiment is desireable in certain business arrangements in which a commercial entity desires a custom-branded carbonation enclosure that will specifically exclude all or as many bottles on the market as possible, except the intended target bottle(s). In this illustrative restrictive embodiment, the carbonation enclosure 102 includes a number of discrimination parameters, more fully described below with respect to FIG. 2A.

Figure 2A:
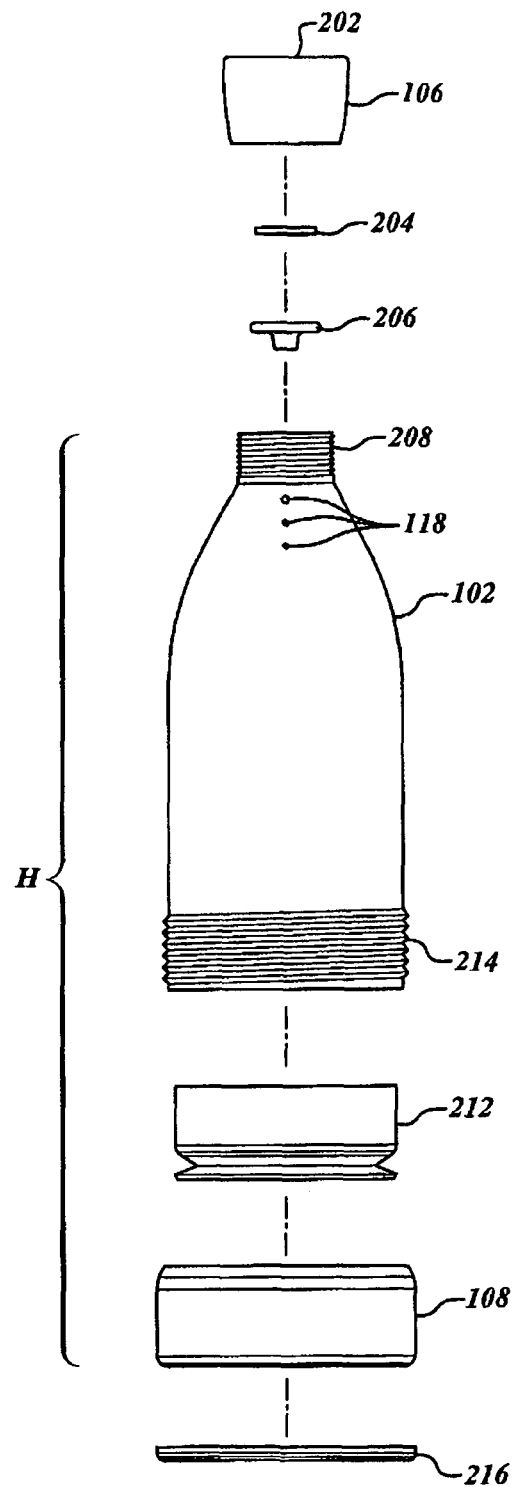
FIG. 2A is an exploded pictorial diagram of a carbonation enclosure shown in FIG. 1.

FIG. 2A shows an exploded view of an illustrative embodiment of the carbonation enclosure 102 of FIG. 1. In one illustrative embodiment, a bottle-shaped enclosure is constructed by assembling the components shown. The components include the carbonation cap 106 having the conical gas port 202, further discussed below with respect to FIGS. 3 and 4. The carbonation cap 106 encloses a bottle port 208, for example, using threads, of the carbonation enclosure 102. A disk 204 may be inserted into the carbonation cap 106 to serve as an interface between the carbonation cap 106 and a self-sealing one-way valve 206. In one illustrative embodiment, the one-way valve 206 is a single piece of food-grade rubber, silicone, urethane, or other synthetic, gas-impermeable, resilient material capable of making a seal. The one-way valve 206 is roughly disk-shaped with a tapered rectangular "snout" protruding downward into the internal space of the carbonation enclosure 102. A channel cut through the one-valve 206 forms a passageway through which gas flows during gas injection. A positive differential pressure of the gas across the one-way valve pushes the walls of the snout apart when filling, but as soon as the gas stops flowing, the walls of the snout are pushed back together forming a gas-tight seal. The one-way valve 206, thus, serves as both a one-way valve for filling the bottle enclosed within the carbonation enclosure 102 with gas, and as a gasket which creates a gas-tight seal between the opening of the bottle and the carbonation cap 106.

The disk 204 is typically rigid and made from hard plastics or metal to form a good seal when pressed against the pliable material of the valve 206. The disk 204 typically has an annular ridge on its surface facing the valve 206 to form a gas-tight seal, isolate the valve's opening from its surrounding, and prevent escape of gas during gas injection from the gas port 302. The disk 204 may also have a second annular ridge on the surface facing the underside of the carbonation cap 106 which serves as a low-friction bearing surface, allowing the carbonation cap 106 to slide against the disk while tightening, so that the rotation of the carbonation cap 106 while tightening does not distort the valve and possibly break the integrity of the seal.

The one-way valve 206 may be a duck-bill valve that opens in one direction under gas pressure and self-seals when gas pressure is removed, thus preventing the escape of gas from the cocktail shaker 102. Those skilled in the art will appreciate that other types of one-way valves may be used for this purpose. For example, a spring-loaded ball may be used in a check valve that allows flow of gas in only one direction. A suitable one-way valve may be selected depending on cost, size, and durability requirements. For example, for home use, a one-piece, low-cost rubber duck-bill valve may be used, while for commercial use, a more durable and expensive check valve may be employed. The opening of the bottle 104 is sealed off when the edge of the valve 206 is pressed against the opening of the bottle 104 via the rigid disk 204. The bottle port 208 is typically threaded to accept the carbonation cap 106. Twisting/screwing the carbonation cap 106 forces the rigid disk 204 onto the valve 206 and a lip of the opening of the bottle 104, thus sealing the bottle 104.

In one illustrative embodiment, the bottom of the body 214 has a triple-start bayonet-style twist-break fitting which consists of relatively coarse, low-tolerance triple-start threads with steep pitch to allow rapid engagement and quick tightening of the body 214 and the base cap 108 together. The pitch of the threads is as steep as is consistent with the amount of friction required to keep base from spontaneously unscrewing. In this illustrative embodiment, with a range of suitable materials and respective coefficients of friction, such as hard plastics, a pitch angle of about 15 degrees provides quick operation while preventing spontaneous unscrewing of the base cap 108 under nominal forces encountered in a tightened base cap 108. In one illustrative embodiment, the threads on the bottle port 208 are double-start threads of such a pitch so as to allow complete removal of the cap with about one and half (1.5) revolutions, on average. Any fewer turns pose a danger that the carbonation cap 106 reaches the end of its thread path during opening before all pressure has been released from the bottle. This is a safety hazard as the carbonation cap 106 may be propelled off of the bottle by remaining gas pressure. More turns of the carbonation cap 106 may take too many revolutions to quickly unscrew the cap, inconveniencing the user.

The type of attachment of the base cap 108 to the body 214 provides several safety features. In one illustrative embodiment, loose tolerance and steep threads between the base cap 108 and the body 214, allow rapid engagement and rapid tightening, and also create a quick release of pressure in the event of an impact on the carbonation enclosure 102, for example by dropping the carbonation enclosure 102 to the ground. The threads are designed to be steep enough such that, in a closed state, the coefficient of static friction is just great enough to hold the base cap 108 in place against the forces that are tending to unscrew it (basically, the force of the bottle 104 on the base cap 108 times the Sine of the angle of pitch of the threads). Under impact, vibrations may cause micro movements of the threads against one another; this changes the coefficient of friction between the two sets of threads (i.e., threads on the body 214 and the base cap 108) from static to kinetic. Since the kinetic coefficient of friction is less than the static coefficient for these materials, impacts will cause the base to spontaneously unscrew, thus releasing pressure.

Additionally, in one illustrative embodiment, the pitch angle of the threads is such that, if an impact were large enough to break the carbonation enclosure 102, the same impact is more than large enough to cause the base cap 108 threads to turn and loosen the attachment of the base cap 108 to the body 214, and thus, break the seal at the lip of the bottle, thereby depressurizing the bottle and rendering it harmless, even if the bottle were to subsequently break moments later as a result of the initial impact.

In one illustrative embodiment, a booster platform 212 may be included to enclose the base of the bottle 104. The booster platform 212 may be inverted (turned upside-down from what is shown in FIG. 2A) to accommodate substantially shorter bottles 104 that cannot be tightly constrained within the carbonation enclosure 102 by shortening the height H via further tightening of the threads between the base cap 108 and the body 214. Thus, the combination of the thread range on the body 214 and a height of the booster platform 212 provide overall height adjustment for the carbonation enclosure 102. The threads of the body 102 provide a first range of height H adjustment for the carbonation enclosure 102, while the height of the booster platform 212 provides an additional second fixed adjustment. Therefore, the total height H adjustment available is the sum of the thread depth and the height of the booster platform 212, minus the thread depth of the threads on the body 214 (because the threads of the body 214 must be fully engaged in the base cap 108 for safety). An advantage of this arrangement is that a height of the base cap 108 is limited such that it reduces or eliminates obscuring a label of the bottle. The labels of expensive sparkling wines serve as a certificate of authenticity and quality and the owner of the bottle generally does not desire the label to be obscured from sight. Additionally, for fast operation, such as inserting/removing a bottle from the carbonation enclosure 102, it is not desirable to have many turns of the threads between the body 214 and the base cap 108.

In one illustrative embodiment the booster platform 212 has a bevel around its perimeter, in both orientations of concave-side and concave-side down, that axially centers the bottle 104 within the carbonation enclosure 102. The circular beveled edges of the booster platform 212 form a small downsloping surface that surround the base of the bottle 104 and slide the bottle 104 towards the axial center of the carbonation enclosure 102, thus keeping the bottle centered automatically.

In an illustrative embodiment, a bottom plate 216 may be used to create a non-slip and/or non-scratching smooth surface for the carbonation enclosure 102. The bottom plate 216 may be made of soft rubber or other similar material. In one illustrative embodiment, the bottom plate 216 may be an integral part of the base cap 108, while in an alternative embodiment, the base plate 216 is affixed to the base cap 108 by, for example, using adhesives or other known means, so that it can be renewed when worn out.

In the restrictive embodiment discussed above, the carbonation enclosure 102 excludes as many types of bottles in the market as possible except a specific target bottle. Additionally, in this restrictive embodiment, the carbonation enclosure 102 may mimic the shape of a particular target bottle as closely as possible. In this embodiment, certain parameters and/or dimensions of the carbonation enclosure 102 may be used as discriminants to exclude other bottles and/or to match the shape of a particular target bottle. One dimension that may be used as a discriminant is height H. Since the enclosure is designed for a specific bottle with a specific height, there is no need for any height adjustment. There need only be enough threads in the base cap 108 to hold the bottle 104 securely and press it against the carbonation cap 106 for a gas-tight seal. In this embodiment, since no height adjustment is necessary, it may be desirable, for aesthetic or other reasons, to have the body 214 enclose the base cap 108. This arrangement creates a more smooth and seamless outer shape, which is more amenable to being tailored to the characteristic shape of a particular target bottle. This arrangement exposes less of the base cap 108 for gripping, for example, during opening and closing the base cap 108, thus, making it more difficult for a user's hand to get a good grip on the base cap 108. In one illustrative embodiment, the bottom surface of the base cap 108 is slightly elevated so as to create an indentation on the underside of the base cap 108. In this indentation, there are features that the hand can grip, much as on the gasoline cap of a car. A soft rubber over-mold may also be deployed over the exposed portion of the base cap 108 that both provides a soft footing, and increases the gripping action of the user's hand.

Other discriminants may also be used in the restrictive embodiment. For example, the bottle port 208 is made just large enough to pass the lip of the bottle 104, thus excluding any bottles with larger-diameter lips. Another discriminant is the inside diameter of a cylindrical portion at the top of the bottle port 208. This inside diameter, which includes the threads for engaging the carbonation cap 106, can be made just large enough to accommodate an annular flange (not shown) under the lip of the bottle, thus excluding bottles with larger diameter flanges. Yet another discriminant is an inside diameter of the booster platform 212 in which the bottle 104 sits in the base can be made the same width as the bottom of the bottle, thus excluding bottles with larger diameter bases. Yet another discriminant is a height/length of the body 214 can be made so that the body 214 just reaches the end of its thread travel and "bottoms out" in the base cap 108 just as the top of the carbonation enclosure 102 just cinches down on the flange of the bottle 104, thus excluding any bottle taller than the target bottle (because the threads won't be fully engaged), and any bottle shorter (because the lip of the bottle won't protrude far enough out of the bottle port 208 to make a seal with the valve 206). One other important discriminant is shape. The shape of the shoulder region of the body 214 (the region where the body 214 profile transitions from concave out to concave in—roughly the "saddle point") can be made so that the inside surface of the shoulder of the body 214 just contacts the shoulder of the bottle at the same instant the body 214 reaches the end of its threads and bottoms out on the top of the base cap 108, and the top of the bottle port 208 just cinches down on the flange of the bottle. This arrangement will discriminate against bottles that have the same height as the target bottle, but which have a higher shoulder. These five discriminants may be used to very finely tailor the bottles that will be accommodated by the carbonation enclosure 102.

In operation, in the universal embodiment, the bottle port 208 is just wide enough to slip over the lip of any known bottle, but is just narrow enough to catch on the annular flange (for example, the flared-out glass feature just below the lip of a Champagne bottle) of any known bottle. The body 214 then flares outward by the amount necessary to accommodate the widest bottle on the market at each elevation measured downward from the flange. The lengths of the body 214 and other components, such as the base cap 108, are chosen to provide an adequate amount of height adjustment, described more fully below.

The base cap 108 typically has threads on the interior cylindrical surface of the base cap 108 that mate to threads at the bottom of the body 214 on the outer cylindrical surface of the body 214. In one illustrative embodiment, the body 213 has about one inch of threads, and the base cap 108 has just over two inches of threads. If the threads of the body 214 are completely engaged with the base cap 108 (i.e. the body 214 is screwed into the base cap 108 one inch until no threads are showing), a little more than one inch of height adjustment remains between the point where the body 214 threads are just barely fully engaged and the point at which the body 214 is screwed all the way down through the base cap 108. Sparkling wine bottles vary in height by over two inches. Therefore, to accommodate all bottles sizes and heights, the height adjustment via the base cap 108 requires over three inches of threads on the base cap 108 to have at least one inch of threads engaged for strength and still have two inches left over for height adjustment to accommodate variations in bottle heights. This arrangement makes the product especially inconvenient to use on short bottles, as the user would have to screw the shell down over as much as three inches of threads every time a bottle was inserted. Additionally such deep base tends to visually obscure the label of the enclosed bottle, which interferes with brand identification.

Figure 6A:
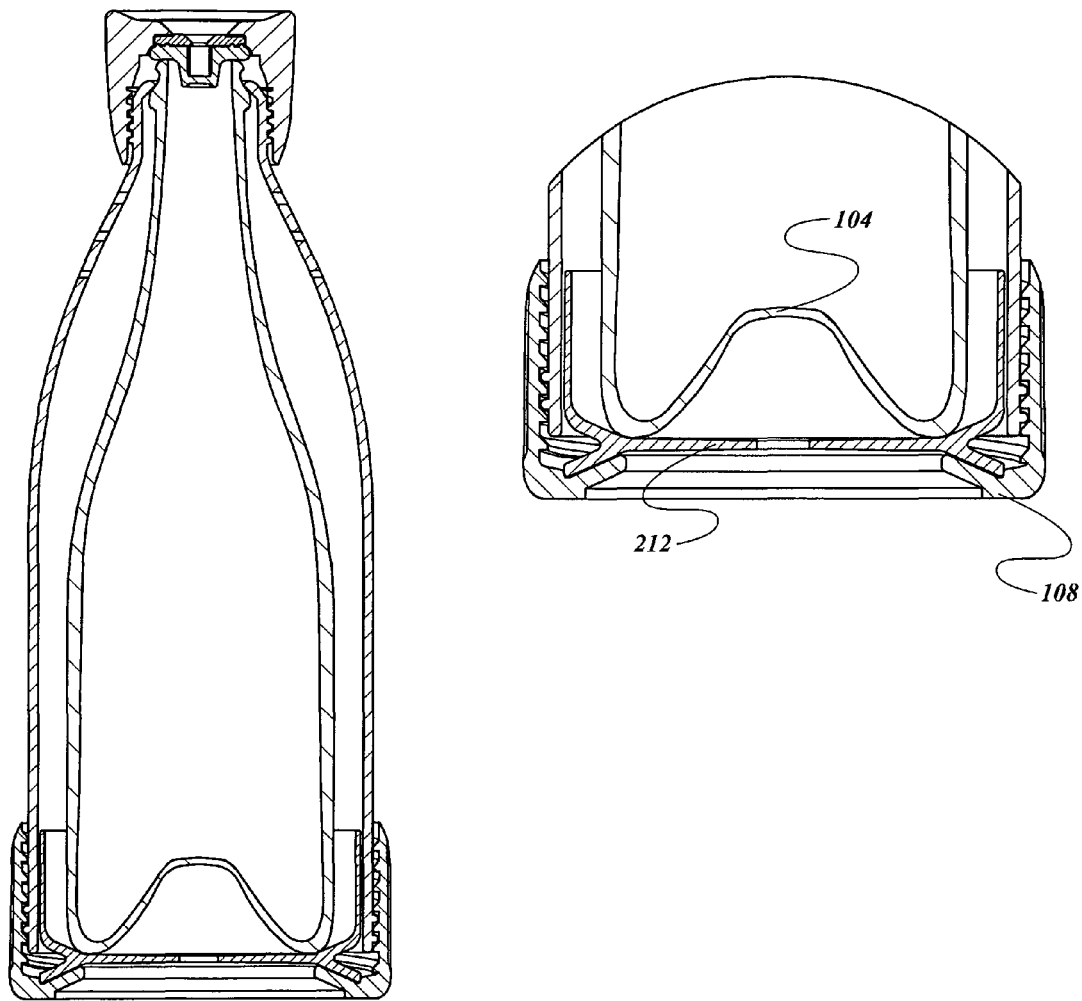
FIG. 6A is a view of removable booster 212 with concave side up.
Figure 6B:
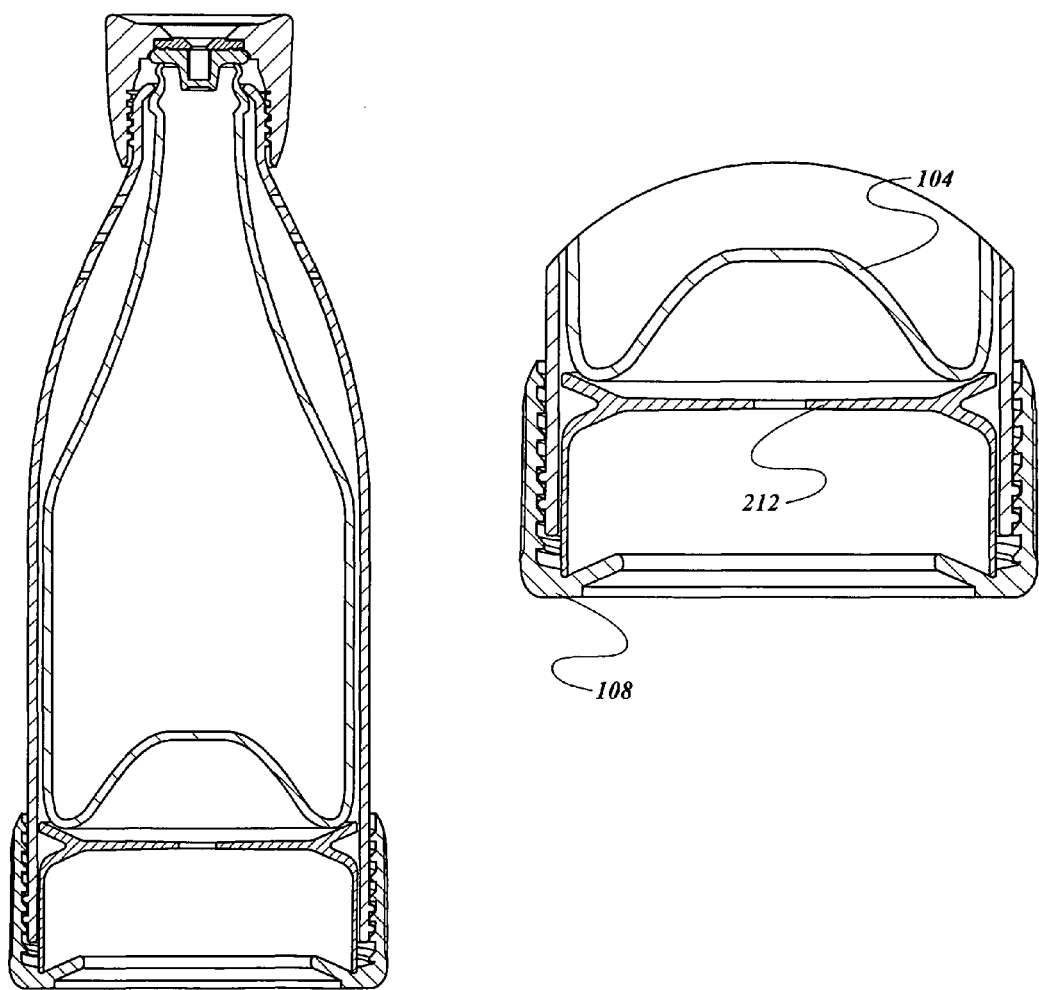
FIG. 6B is a view of removable booster 212 with concave side down.

In one illustrative embodiment, a short body 214 and a long body 214 may be used for accommodating short and tall bottles, respectively. This embodiment may have usability, packaging, and cost issues associated with it. In an alternative illustrative embodiment, the removable booster (not shown) with a height of about one inch may be used. The booster could be placed inside the base cap 108 to accommodate bottles that are below the median height and removed to accommodate bottles that are above the median height. In yet another illustrative embodiment, a cup-shaped (hollow) reversible booster platform 212 may be used that is always inside the base cap 108. As described above, the booster platform 212 fits in the base cap 108 concave side up to accommodate tall bottles, as shown in FIG. 6A, and concave side down to accommodate short bottles, as shown in FIG. 6B. In the concave-side-up orientation, tall bottles fit down into the booster platform 212, while in the concave-side-down orientation, short bottles sit on top the booster platform 212. In this embodiment, the height of the base cap 212 is kept low to reduce the amount of screw action necessary to insert or remove a bottle, and to minimize the obfuscation of the label, while still maintaining the amount of adjustment necessary to accommodate all bottles—without removable parts which are subject to loss.

Figure 2B:
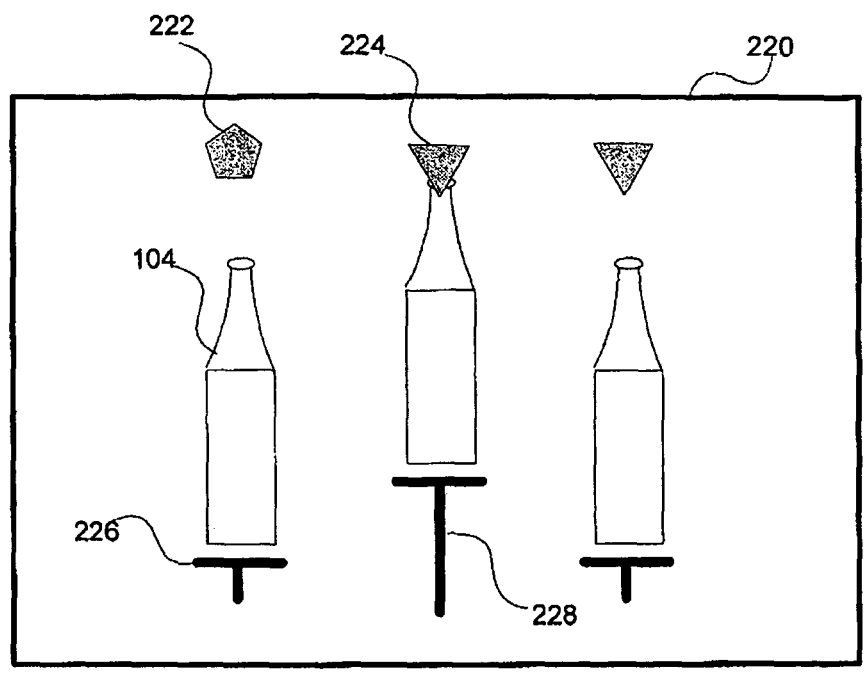
FIG. 2B is a pictorial diagram showing another illustrative embodiment of the carbonation maintenance system.

Other illustrative embodiments of the carbonation enclosure are possible without departing from the spirit of the disclosure. FIG. 2B is an illustrative embodiment of a stationary carbonation enclosure which may be used to contain multiple bottles of sparkling beverages. In this illustrative embodiment, a safety enclosure 220 with shatter-resistant glass or clear-plastic walls may be used to keep, preserve, and pressurize the multiple bottles 104. In this embodiment, the safety enclosure 220 keeps the high-pressure bottles 104 physically isolated from outside as a safety measure. The safety enclosure 220 may also include air-vents to prevent pressurization of the safety enclosure itself.

A bottle-nozzle coupling mechanism is needed to couple the opening of the bottle 104 with a gas nozzle for pressurization. In one illustrative embodiment, the bottle-nozzle coupling mechanism includes a height adjustment platform 226 pushes bottles of different heights up to a gas delivery nozzle 222. For example, a manually operated or motorized round height adjustment platform 226 with screw threads or a pneumatic cylinder may be used to provide the height adjustment. In one illustrative embodiment, the height adjustment platform 226 is round and beveled at the base to keep the bottle 104 axially centered on the height adjustment platform 226. This way, the bottle 104 positively engages and avoids missing contact with a conical nozzle 224 for gas injection, more fully described below. In one illustrative embodiment, the safety enclosure 220 may be refrigerated to keep the bottles 104 chilled at a desired temperature.

In one illustrative embodiment, a cap 222 similar to the carbonation cap 106 may be used to cap the bottles 104. In an alternative embodiment, a different arrangement than the carbonation cap 106 may be used to improve safety of the apparatus. A pressurized glass bottle 104 that is taken out of the safety enclosure 220 may present danger of bursting of the pressurized bottles 104. In the alternative embodiment, the conical nozzle 224 may be used to directly, without an intermediary carbonization cap, seal and inject CO2 into the bottle 104. In one illustrative embodiment, the conical nozzle 224 is a push-to-open type nozzle that is spring-loaded conical nozzle that, when pressed with a predetermined amount of force, opens and allows CO2 to flow through the conical nozzle 224 into the bottle 104 from a stationary CO2 source, such as a high-pressure gas tank. The conical nozzle 224 may be coated with rubber or other similar material to effectively seal the lip of the bottle 104 when pressed. In this embodiment, the CO2 source need not be removed while the bottle is in the safety enclosure 220. A pressure regulator inline with the CO2 source delivers the gas until the preset pressure is reached. The bottle 104 simply remains connected to gas source, via the conical nozzle 224, until the bottle 104 is lowered away from the nozzle by lowering the height adjustment platform 226.

Those skilled in the art will appreciate that there are other ways of starting and stopping the flow of CO2 gas and of sealing the bottle 104. Similarly, the bottle-nozzle coupling mechanism may be implemented in other ways. For example, instead of raising the bottle 104 to engage the conical nozzle 224, the conical nozzle 224 may be lowered using a pneumatic arrangement, a screw-feed mechanism, or other known methods of imparting translinear motion, to engage the lip of the bottle 104.

The safety enclosure 220 may be implemented with one nozzle or a number of nozzles that is fewer than the number of bottles in the safety enclosure 220, and the same number of bottle-nozzle coupling mechanisms (not shown). In one illustrative embodiment, the safety enclosure 220 includes a bottle conveyor mechanism that positions a desired target bottle on a height adjustment platform to be raised to couple with a single nozzle for pressurization before use. In another illustrative embodiment, a few nozzles and an equal number of bottle-nozzle coupling mechanisms are used in parallel. In yet another illustrative embodiment, a robotic system is used to fetch and feed a desired target bottle to a pressurization station including a conical nozzle and a bottle-nozzle coupling mechanism as described above. In one illustrative embodiment, the robotic system is implemented as a small subsystem inside the safety enclosure 220. In another illustrative embodiment, the robotic system is external to the safety enclosure 220.

The conical shape of the conical nozzle 224 provides axial centering and alignment of the bottle 104 with the push-to-open conical nozzle 224. The angle of the cone of the conical nozzle 224 is typically shallow enough to prevent the nozzle from getting stuck in the mouth of the bottle, while steep enough to provide proper axial alignment. In one illustrative embodiment, an angle of about 60 degrees (measured with respect to the flow axis of the nozzle) accomplishes this purpose.

Figure 3:
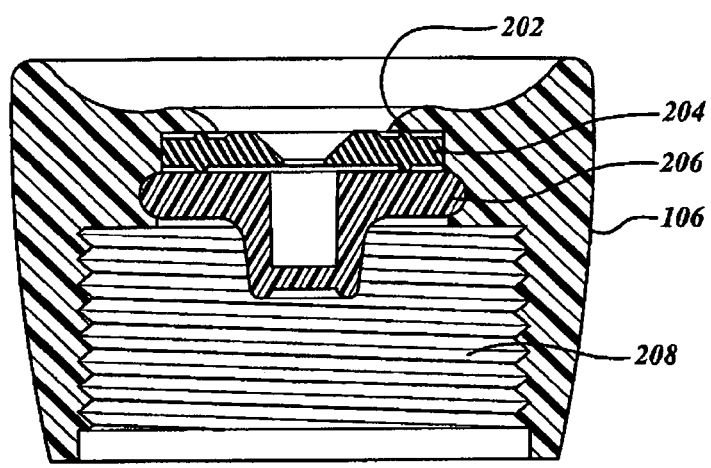
FIG. 3 is a pictorial diagram of a detail of an illustrative carbonation cap shown in FIG. 2A.

FIG. 3 shows the details of the carbonation cap 106. In one illustrative embodiment, the gas port 202 has a conical section for interfacing with the nozzle 116. The duckbill one-way valve 206 includes a triangular section inlet which, permits injection of gas from outside but does not allow the gas to escape from the bottle 104. In operation, the duckbill valve 206 inlet spreads apart under gas pressure from the nozzle 116 and allows the gas to pass through to the bottle 104. The gas delivery device 110 is generally configured to stop the gas flow at a predetermined pressure, such as 60 or 90 PSI. During injection of gas into the bottle 104, when the predetermined pressure is reached, the gas injection stops and the duckbill valve 206 inlet shuts closed under its own elastic force as well as the internal gas pressure of the bottle 104, now at the predetermined pressure. No gas can escape from the now sealed inlet of the duckbill valve 206 or the opening of the bottle 104 sealed by the rim of the duckbill valve 206.

Figure 4A:
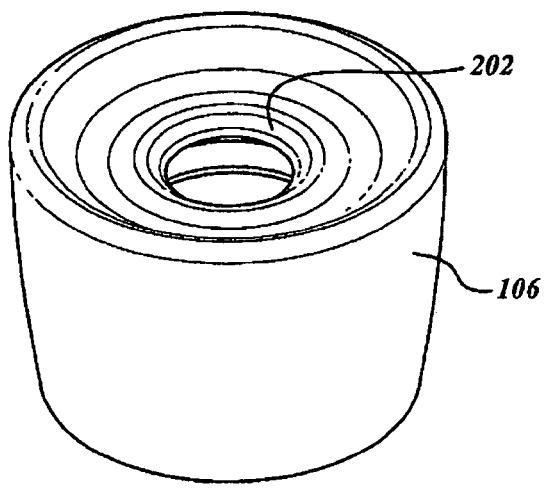
FIG. 4A is a pictorial diagram of an illustrative gas port of the illustrative carbonation cap of FIG. 2A.
Figure 4B:
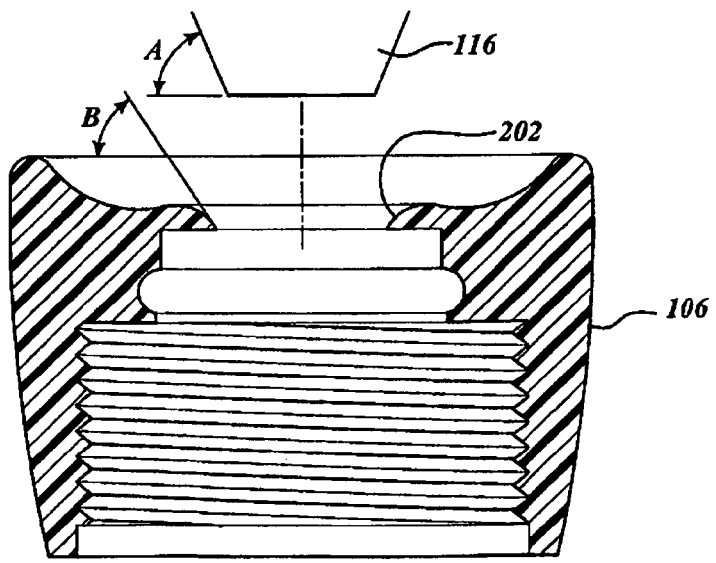
FIG. 4B is a pictorial diagram of the illustrative gas port interface with a nozzle of a carbonation gas source.

FIGS. 4A and 4B show details of a conical section of the gas port 202. In one illustrative embodiment, the gas port 202 has a conical section to interface with the nozzle 116. The nozzle 116 includes, in one illustrative embodiment, a conical rubber tip with a concentric hole through which gas flows. The nozzle 116 and the gas port 202 form a tight seal at a wide range of angles of engagement between the nozzle 116 and the gas port 202. The engagement between the nozzle 116 and the gas port 202 need not be collinear to form a gas-tight seal because the intersection between a conical nozzle 116 and the top surface of the gas port 202 is an ellipse, which is a planar shape and can operate at a wide range of angles between the nozzle 116 and the gas port 202. This is in contrast with the behavior of a Schraeder valve, found on automobile tires, which requires a co-linear mating of the gas nozzle and the valve to prevent gas from escaping during inflation. Angles A and B, for the nozzle 116 and the gas port 202, respectively, are generally different to accommodate different angles of engagement. Angle B of the gas port 202 is smaller so that the nozzle 116 can be coupled with the gas port 202 at various angles without breaking the coupling seal while injecting gas. Because of the secure coupling between the nozzle 116 and the gas port 202, it is possible to fill the bottle 104 at an angle with respect to the vertical axis or even in an upside down position. In the upside down position, the gas blasts up through the liquid while filling, aiding the absorption process, and creating a spectacular visual effect. An apparatus (not shown) may be used to hold the carbonation enclosure 102, with the bottle 104 inside, in an upside-down position to aid faster and quicker carbonation in this position, if desired.

The gas port 202 has a circular shape on its upper surface, as shown in FIG. 4A, which is greater in diameter than the smallest diameter of the conical nozzle 116 (i.e., the tip of the nozzle where gas is discharged into the bottle 104), but smaller in diameter than largest diameter of the conical nozzle 116. The precise dimensions are chosen so that the conical nozzle 116, when engaged, couples with the gas port 202 at about midway between the top and the tip of the conical nozzle 116. The conical section of the gas port 202 prevents undue wear of the rubber conical nozzle 116 and provides a better mate between the two parts, as described above.

Figure 5:
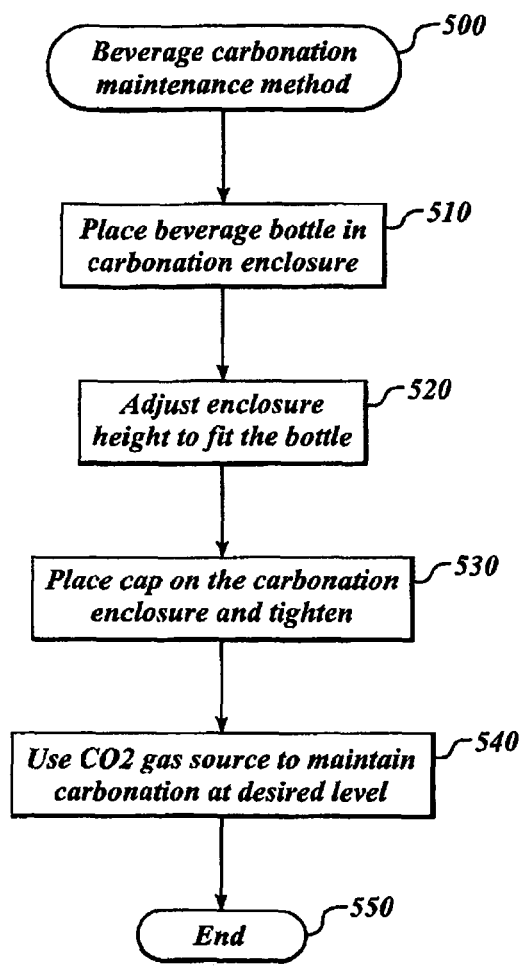
FIG. 5 is a flow diagram of an illustrative method of maintaining carbonation of a beverage.

The overall operation and usage of the carbonation enclosure 102 to maintain or increase the carbonation of a sparkling beverage, such as wine, is described with reference to the flow diagram of FIG. 5. With reference to FIGS. 1, 2, and 5, the process starts at block 500 and proceeds to block 510 where the bottle 104 is placed inside the carbonation enclosure 102 through the base of the body 214. The height H of the carbonation enclosure 102 is adjusted in a manner described above with respect to FIG. 2A. The height H is adjusted via a combination of screwing the body 214 into the base cap 108 and the use of the booster platform 212. For shorter bottles 104, the booster platform 212 may be turned upside down to get the lip of the bottle 104 closer to the carbonation cap 106 and the one-way valve 206 for subsequent sealing of the bottle 104. Next, the body 214 is tightened to move the bottle into position for firm contact with the one-way valve 206 for sealing the bottle 104. For longer bottles, the booster platform 212 is used in a concave-side up configuration to contain the bottom of the bottle 104 and then adjust the height H only via the threads on the body 214 and the base cap 108. The high pitch and multi-start threads on the body 214 and the base cap 108 enable quick opening and closing of the base cap 108. At block 530, the carbonation cap 106 is screwed onto the bottle port 208 to seal the bottle 104. In one illustrative embodiment, the carbonation cap 106 has multi-start high-pitch threads also, similar to the threads on the base cap 108, for quick opening and closing of the carbonation cap 106. This operation is important for convenience and efficiency, especially in commercial operations, such as bars and restaurants, where high volumes of drinks are served. Once the bottle 104 is sealed, further escape of gas from the beverage is prevented, preserving the freshness and taste of the beverage. At block 540, it may be determined, for example by tasting the beverage, that the $CO_2$ gas pressure and/or content of the beverage in the bottle 104 is too low for consumption. In this case, the gas delivery device 110 may be used to inject more $CO_2$ into bottle 104 through the gas port 202. The nozzle 116 of the gas delivery device 110 need not be co-linear with the gas port 202 for injection of gas without gas leakage. The conical section of the gas port 202 makes gas injection possible at angles of 10-20 degrees or more with respect to a co-linear axis between the nozzle 116 and the gas port 202. This arrangement provides flexibility of operation by not requiring precise placement and alignment of the nozzle 116 with the gas port 202 when the user is busy and working fast to carbonate a beverage. The process terminates at block 550.

The above specification, examples, and data provided a complete description of the manufacture and use of the composition of the disclosure. Since many embodiments of the disclosure can be made without departing from the spirit and scope of the disclosure, the invention resides in the claims hereinafter appended.

The invention claimed is:

1. An apparatus for maintaining carbonation of a beverage, the apparatus comprising:
   a rigid enclosure having a body with an external threaded section having multiple starting threads;
   a threaded base cap with an internal threaded region extending the entire depth of the cap, removably coupled with the body of the rigid enclosure via a section of external threads at the lower edge of the of the body of the rigid enclosure, with the height of the base cap and the threads contained therein of sufficient length to allow the rigid enclosure to fit a range of beverage bottles of varying heights; and
   a concave booster with a hollow cylindrical body, open at one end and closed at the other end that fits removably within the threaded base cap in two possible orientations, either concave-up or concave-down, to accommodate beverage bottles of varying heights by adjusting the effective length of the rigid enclosure, thereby accommodating the beverage bottles of varying heights;
   the threaded base cap with the concave booster providing the height adjustment required to accommodate variation in bottle heights while minimizing the degree in which the threaded base cap visually obscures the beverage bottle label.

2. The apparatus of claim 1, wherein the booster having the concave-up orientation presents a first beveled ridge, on which the bottom of taller beverage bottles rest, the slope of said first beveled ridge configured to center the beverage bottle axially within the enclosure, and wherein the booster in the concave-down orientation presents a second beveled ridge configured to axially center shorter beverage bottles; and further, the second beveled ridge acts to center the booster within the base cap when the booster is in the concave-up position.

* * * * *